June 24, 1930.  G. H. DAVIS  1,766,245
LANDING GEAR FOR AIRPLANES
Filed March 5, 1929    2 Sheets-Sheet 1
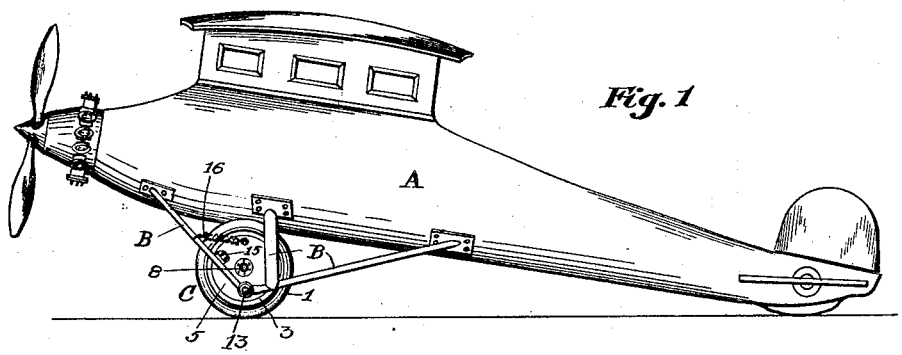
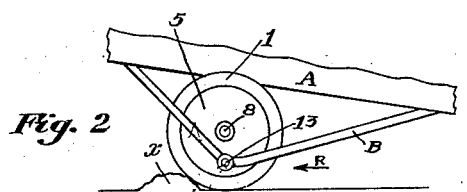
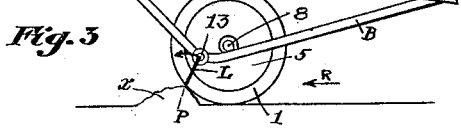
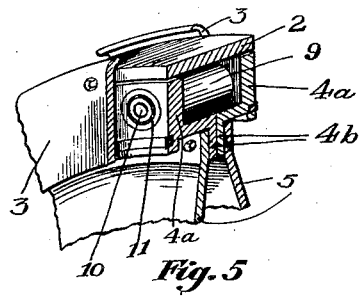
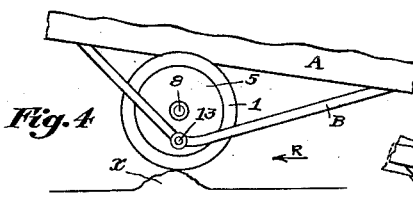
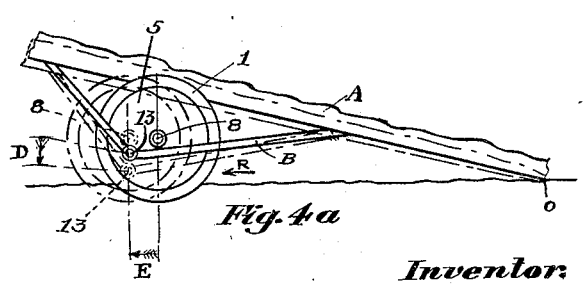
Inventor:
GEORGE H. DAVIS.
By Henry L. Chenery.
Attorney.

June 24, 1930.  G. H. DAVIS  1,766,245
LANDING GEAR FOR AIRPLANES
Filed March 5, 1929  2 Sheets-Sheet 2
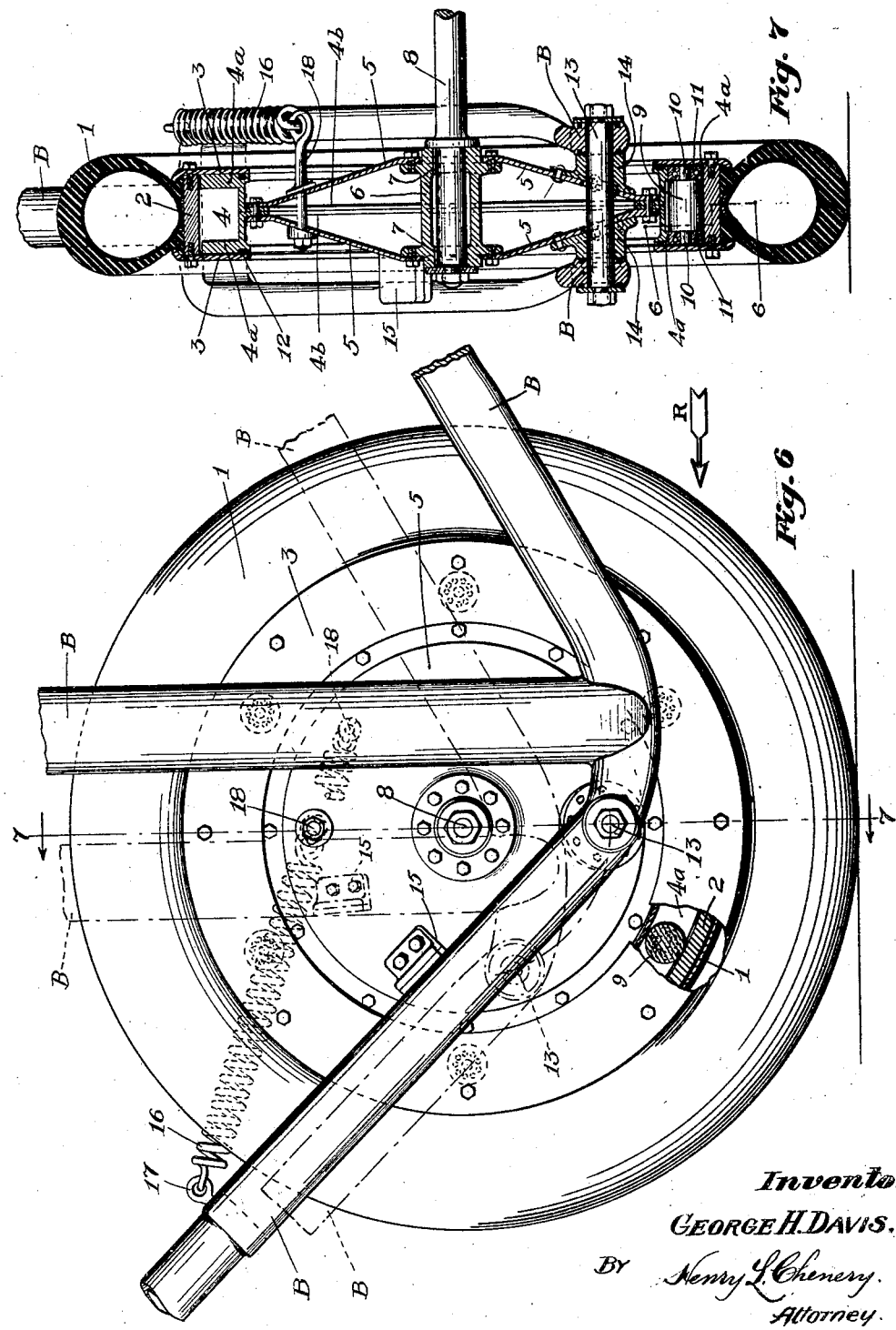
Inventor:
GEORGE H. DAVIS,
By Henry L. Chenery.
Attorney.

Patented June 24, 1930

1,766,245

UNITED STATES PATENT OFFICE

GEORGE H. DAVIS, OF AUGUSTA, MAINE

LANDING GEAR FOR AIRPLANES

Application filed March 5, 1929. Serial No. 344,221.

The invention to be hereinafter described relates, in general terms, to the landing gear for airplanes, but deals particularly with improvements in the wheels for these devices, embodying principles which it is believed are novel, both from the standpoint of structure and operation.

Land planes usually are equipped with non-tractable wheels, operating somewhat after the order of the ordinary wagon wheels, revolving concentrically on or with an axle properly supported from the body or fuselage of the airship.

Airplanes provided with this type of wheel, when either landing or "taking off," have a tendency to somersault in case the wheels strike some considerable obstruction — as hummocks on the landing field, mud-holes or rocks—the forward end of the airplane dipping and the tail rising, oftentimes resulting in disaster both to the machine and its occupants.

The peculiar construction of my improved wheel produces, in operation, a result directly opposed to the foregoing, as immediately the wheels meet resistance to forward movement its central portion acts to quickly and forcibly lift the forward end of the plane with a consequent reaction tending to hold the tail to the ground.

The invention may best be understood by reference to the following description, taken in connection with the accompanying drawings in which is disclosed an illustrative embodiment thereof, and in which similar reference characters are employed to identify like parts in all the different views.

In the drawings—

Fig. 1 is a side elevation of an airplane equipped with my improved landing gear;

Figs. 2, 3 and 4 are progressively arranged diagrammatical illustrations of the action of the wheels when meeting and overcoming an obstruction;

Fig. 5 is a fragmentary, sectional perspective view of the wheel rim, showing one of the roller bearings;

Fig. 6 is a side elevation of the wheel, on an enlarged scale, with a cut-away portion showing a section taken on line 6—6, Fig. 7, and Fig. 7 is a transverse sectional elevation of the wheel, the section being taken on line 7—7, Fig. 6.

Before proceeding with a description of the invention it might be well to state that various modifications thereof in structural details are possible without departure from the meaning and intent of the invention, and the disclosure as will hereinafter be set forth and as exemplified in the drawings is the embodiment which I have elected to employ simply to illustrate the principles upon which the operation of my device is based.

Referring to Fig. 1, A represents the body or fuselage of an airplane and B the braces and struts which support it on the wheels C.

In the construction of the wheel C which, together with the parts immediately connected therewith form the major portion of my invention, I employ a tire 1, preferably of the pneumatic type.

I mount this tire on a rim which includes the tire band 2 and lateral plates 3. One of these plates may form an integral portion of the band 2 but at least one of them necessarily must be detachable in order to allow of the felly 4 being housed between them.

The felly is built up of sections having side walls $4^a$ and inwardly turned flanges $4^b$, the latter being bolted or welded to the discs 5 which extend to and are secured on the central hub 6 of the wheel. Keyed to this hub 6, by means of the keys 7, is a shaft 8 which serves as an axle for the landing gear by connecting the two wheels C together.

It is not absolutely essential that this shaft be employed, as the wheels may be used independently, one of the other, but for reasons which will hereinafter appear it is preferred to have them act as a unit, or connectedly.

Mounted between the portions $4^a$ of the felly and spaced therearound at intervals are rolls 9 having journals 10 operating in ball or roller bearings 11, the outer races of these bearings being fixed in the walls $4^a$.

The faces of the rolls 9 bear on the inside periphery of the tire band 2 and project slightly beyond the outside diameter of the felly. Thus the rim and tire may revolve freely on the central portion of the wheel and are held against displacement which and the walls 4ª the plates 3, between which and the walls 4ª are packing rings 12 which exclude dust and dirt from the bearings.

Located in radially spaced relation to the center of the wheel is a shaft 13 operable in bearings 14 which are secured to the disc plates 5.

Astride of each wheel and secured on the ends of the shafts 13 are the yoked portions of the frame B which extend, in any approved type of construction, upwardly to the body of the airplane—as seen in Fig. 1.

It is obvious that a principal portion of the weight of the airplane is borne by the shafts 13-and that, normally, this weight acts to keep the shafts in approximate vertical alignment with the respective and centrally disposed shafts 8.

If in ordinary maneuvering of the airplane on the landing field the surface of the latter is smooth and unbroken the rim and tire of the wheel revolve freely on and over the rolls 9 and the disc and shaft 13 remain substantially as seen in Figs. 2 and 6—the stop plate 15 holding the disc against rotary movement in a counter-clock-wise direction. Upon extreme rotary movement in the opposite direction the disc is checked in its movement by the stop plate impinging on the central strut of the frame B.

But the purpose of the invention is not apparent when the airplane is negotiating smooth surfaces.

In Figs. 2, 3 and 4 the wheel is illustrated, in simple diagrams, when operating under quite different conditions. Fig. 2 depicts the wheel just at the point of meeting an obstruction $x$, it being understood that in this case the airplane is under way and travelling at considerable speed in the direction indicated by the arrow R. The progress of the tire is momentarily and temporarily arrested by its impact against the obstacle, but the shaft 13, due to the momentum of the machine, continues to move forwardly—and upwardly—into the position as indicated in Fig. 3.

The upward movement of the shaft has the effect of lifting the body of the airplane an indefinite distance—depending on the intensity of the impact of the wheels against the obstruction, this distance being represented for illustrative purposes by the character $y$, Fig. 3.

In this dual movement of the shaft 13—forwardly and upwardly—an action closely simulating the swinging of a pendulum is produced, the shaft 8 representing the point from which the latter is suspended and 13 the weight on its free end, moving in response to an impact given it by some outside means.

Due consideration should be given the fact that the body of the airplane is being forcibly projected in an upward direction simultaneously with its movement forwardly, the force of its acquired momentum acting directly on the shaft 13 which, to all intents and purposes, is a crank swinging from its pivotal point at 8; and the resultant of these combined forces effective in onward and upward directions, causes the shaft 13 and the wheel C to mount the obstacle in much the same manner as a horse leaps over a hurdle while running.

Another example quite closely analogous, illustrating the principle on which this swinging shaft 13 acts might be cited in the case of an athlete preparing to make a high jump with a vaulting pole—the pole, in this instance, being represented by the line L in Fig. 3, the foot of the pole corresponding to the point at which the tire makes contact with the obstruction, at P, and the athlete's body to the shaft 13.

Should the obstruction be in the nature of a more continuous resistance, such as a long muddy stretch of ground, a ploughed or a very rough field, then the wheels partake of an intermittent action, the shaft 13 alternately rising and lowering as the resistance to the forward movement of the tire is progressively overcome.

In the foregoing recital of the operation of the landing wheel C the airplane has been considered as moving forwardly and meeting the obstructions at considerable speed. In Fig. 4ª a somewhat different condition is assumed to be present.

In the present aspect of the case the wheel is stalled in a hole, bringing the machine to a stop. The airplane motor has forced the body of the plane forwardly so that the shaft 13 is located in advance of a plumb line from the shaft 8, which is the central point of the wheel. Now, by slackening the speed of the motor the weight of the airplane body will cause the shaft 13 to drop a distance indicated by the letter D, and in doing so, force the disc 5 to rotate counter-clockwise, advancing the point 8 and the whole wheel a distance E—assuming, of course, that the tail of the airplane remains fixed at the point $o$.

Upon again speeding up the motor, the body of the airplane will advance, carrying the shaft 13 into the position it previously occupied, relative to the disc, and bringing the tail of the plane forwardly into a new position on the ground. Alternately increasing and decreasing the speed of the motor will have the effect, finally, of forcing the wheel out of the hole.

Reverting to a consideration of the function of the shaft 8, it is obvious that by securing the two wheels thereon, more stability to the wheels and to the whole structure is procured. But other advantages accrue by the use of this shaft.

For instance, when one only of the wheels strikes an obstruction the initial lifting of the plane body is accomplished by the actuation of both wheels acting in unison, making it possible to keep the airplane in better balance than would be the case was each wheel acting independently of the other.

Then too, in the case of the mud hole in which but one of the wheels is mired, the wheel having the better ground support is of considerable assistance to the other in bringing it out of the hole on to solid footing.

For the purpose of quickly bringing the wheels back into their normal position, as shown in Fig. 6, after having left the ground either from a rebound or when making a "take off", I provide a spring 16 securing one end to any conveniently located part of the frame B, as at 17, and the other end made fast to a bolt or stud 18 extending out from the disc 5. The tension of this spring acts to yieldingly hold the stop member 15 strongly against the forward brace of the frame B and in that position from which action should normally begin when the disc rotates to raise the airplane. Otherwise, should the wheels be left in the position as seen in Fig. 3 after leaving the ground, then, on again landing, the front end would dip rather than rise due to the fact that the weight of the machine would force the shaft 13 downwardly, or from the position as shown in Fig. 3 to that in Fig. 2.

The airplane may, if desired, be equipped with a braking mechanism (not shown) which would be operative on one or both of the lateral plates 3 of the rims.

It is believed that a landing gear equipped with wheels having characteristics similar to those of the present invention will be the means of preventing a very large proportion of the accidents caused, in the ordinary wheel equipped airplane, by collision with objects on the landing field.

Having thus described my invention, what I claim and desire to secure by Letters Patent is:

1. In a device of the character described comprising a shaft, a disc concentrically fixed on one end of said shaft, a felly on said disc, a plurality of rolls revolubly mounted in said felly, a rim revoluble over said rolls, flanges on said rim adapted to enclose said felly, packing means between said felly and said flanges, a tire on said rim, a crank-pin mounted in said disc in parallel and spaced relation to said shaft, a yoked frame straddling said tire and disc, bearings in said frame in which the ends of said crank-pin are journalled, said frame extending upwardly to the body of said plane, a stop member to limit the rotation of said disc in either direction, a spring adapted to hold said stop in yielding engagement with said frame, and a duplicate set of the foregoing elements disposed on the opposite end of said shaft.

2. A landing gear for airplanes comprising an annular rim, a tire mounted on said rim, a disc revolubly mounted within said rim, an axle concentrically fixed in said disc, a shaft, adapted to serve as a crank-pin, secured in said disc in radially spaced relation to said axle and normally disposed on said disc below and in vertical alignment with said axle, a frame journalled on said shaft, and means to hold said disc against rotation from its normal position in one direction.

3. A landing gear for airplanes comprising a rim, a tire on said rim, a disc revolubly mounted in said rim, a shaft fixed in said disc below and radially spaced from the axis of said disc, and a frame, adapted to support an airplane body, journalled on said shaft.

4. A landing gear for airplanes comprising in combination with an airplane frame, a rim, a tire on said rim, a disc revolubly mounted within said rim, an axle concentrically fixed in said disc, a shaft, on which said airplane frame is journalled and supported fixed in said disc and disposed beneath and in radially spaced relation to said axle, a stop-plate fixed on said disc and adapted to impinge on said airplane frame to hold said shaft normally in vertical alignment with and beneath said axle, whereby said disc is held against rotary movement from its normal position in one direction, and a spring secured at one end to said disc and at the other to said frame, said spring being adapted to yieldingly hold said stop-plate engaging said frame when said tire is off the ground.

In testimony whereof I affix my signature.
GEORGE H. DAVIS.